United States Patent [19]

Fechner

[11] Patent Number: 4,511,943
[45] Date of Patent: Apr. 16, 1985

[54] DAMAGE CONTROL APPARATUS FOR MAGNETIC TAPE TRANSPORT

[75] Inventor: Erno H. Fechner, Redwood City, Calif.

[73] Assignee: Ampex Corporation, Redwood City, Calif.

[21] Appl. No.: 364,733

[22] Filed: Apr. 2, 1982

[51] Int. Cl.³ .............................................. G11B 15/60
[52] U.S. Cl. .................................................. 360/130.23
[58] Field of Search ...................... 360/130.22, 130.23, 360/130.24, 85, 102, 103, 84; 226/196, 197

[56] References Cited

U.S. PATENT DOCUMENTS 4,249,222 2/1981 Iwasaki ........................... 360/130.23
4,442,465 4/1984 Hedlund et al. ............... 360/130.23

FOREIGN PATENT DOCUMENTS 0565410 7/1977 U.S.S.R. ......................... 360/130.23

Primary Examiner—Raymond F. Cardillo, Jr.
Attorney, Agent, or Firm—Harry G. Thibault; Joel D. Talcott

[57] ABSTRACT

To prevent damage to rotating heads in a helical tape transport, as by jamming and balling of rewinding tape at the drum entrance and exit guides, a damage control guide is mounted on the guide drum tape path near the entrance guide and another beneath the exit guide.

6 Claims, 3 Drawing Figures

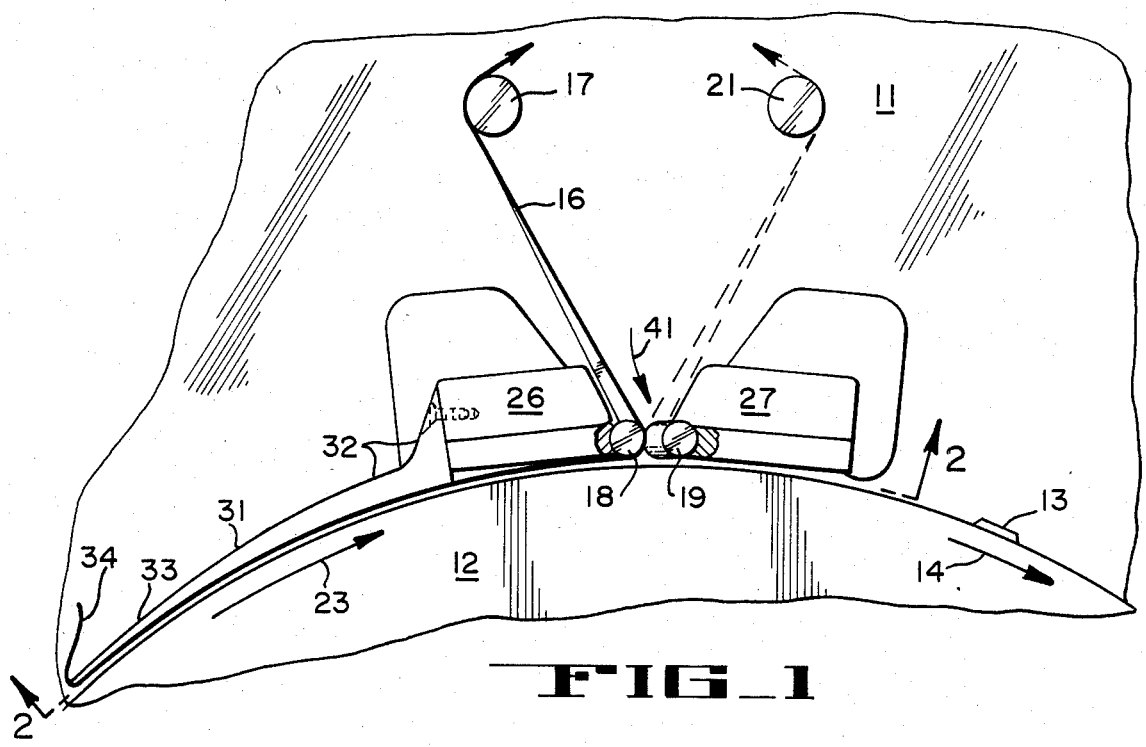
FIG_1
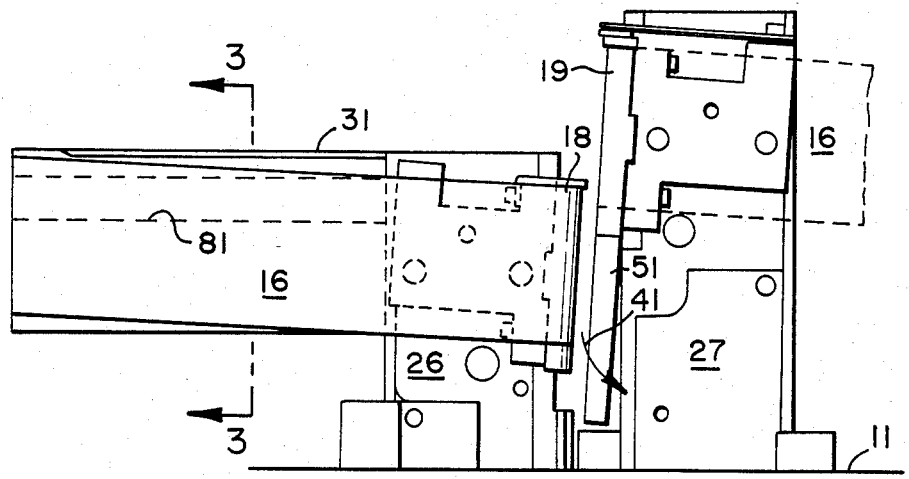
FIG_2
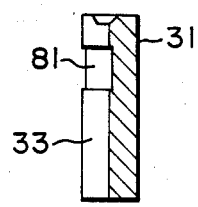
FIG_3

DAMAGE CONTROL APPARATUS FOR MAGNETIC TAPE TRANSPORT

This invention relates to magnetic tape transports, and particularly to transports of the helical-scan variety.

The rotating head or heads of a helical-scan magnetic tape transport are extremely small, finely machined, intricately constructed, precisely positioned and adjusted, easy to damage, and unusually costly in comparison with other portions of the transport.

In the transport employing the present invention, the head drum rotates at 3600 rpm, and the tape in forward play-record mode moves at about 100 inches per second, providing a head-to-tape speed of 833 inches per second at the end of the rewind mode, the tape moves in reverse at about 2-5 inches per second, and the head drum at nearly the same speed as during play-record mode, for although the drum motor is de-energized, the drum has high momentum and takes a long time to coast to a stop. During the coasting phase, just as during forward play-record mode, a substantial self-acting pressurized air bearing is generated by the drum beneath the tape, so that the tape is lifted away from the drum for a radial distance h (about 3-5 microinches) h being a function of the drum radius, the tape tension, and the head-to-tape speed, as is well known in the art.

However, as the trailing end of the tape leaves the "takeup" reel (i.e., the reel upon which the tape was wound during forward mode, which reel acts as a "supply" reel during rewind mode), the tape tension is suddenly released, and the free tape end is whipped around the drum in such a way as often to double-up and become jammed in the tiny space (0.010 inch) between the drum and the entrance guide post, and occasionally even between the drum and the exit guide post.

When such jams occur, a "ball" of tape fills the space and obtrudes into the path of the rotating head, stopping it abruptly and severely damaging or destroying the head.

This phenomenon does not appear to happen during the faster tape motion period of the forward play-record mode, and it is easy to infer that at high speed the necessary conditions do not have time to develop.

Even when the jamming does occur, during rewind mode, the precise behaviour of the tape is difficult to observe and the contributing conditions are not surely known.

The tendency of the free tape end, suddenly released from hold-back tension, to snap forwardly like a rubber band, must certainly be a contributing condition.

So also must be the centrifugal force imposed on the tape end in its journey around the circular-cylindrical drum.

So also must be the effect of the drum-generated air bearing, which tends to push the tape in the same direction as does the centrifugal force.

Also affecting the phenomenon (but whether aiding or the opposite is not known) would be the fact that the converging zone between the tape and entrance guide structure generates another pressurized air film into which air is "pumped" by the moving tape, in a manner well known in the art.

The prior art has examples of attempts to deal with this problem, as by, e.g., mounting a baffle plate normal to the tape, and as close thereto as possible, and near the entrance guide structure.

Such an arrangement proved to be ineffective with the present transport apparatus.

It is therefore an object of the present invention to provide protective structure for the heads of a helical-scan magnetic tape transport, and particularly to prevent jamming of the tape adjacent the rotating path of the heads.

SUMMARY OF THE INVENTION

To prevent damage to rotating heads in a helical tape transport, as by jamming and balling of rewinding tape at the drum entrance and exit guides, a damage control guide is mounted on the guide drum tape path near the entrance guide and another beneath the exit guide.

DESCRIPTION OF THE DRAWINGS

FIG. 1 is a fragmented plan view of the drum and tape entrance-exit guide structure of a magnetic tape transport, showing the structure of the invention;

FIG. 2 is a fragmented cross-sectional elevation view taken along the curved surface 2—2 of FIG. 1; and FIG. 3 is a cross-sectional elevation taken on the plane 3—3 of FIG. 2.

DESCRIPTION OF THE PREFERRED EMBODIMENTS

Referring now to the drawing, there is shown a magnetic tape transport "top plate" or "tape deck" 11, from which projects a rotating scanning drum 12 bearing a magnetic transducing head 13 (shown as projecting for an exaggerated radial dimension from the drum 12 for the sake of visibility), which rotates in the direction of arrow 14. During forward modes of operation, the tape 16 moves from a guide post 17 to and around the "entrance" guide post 18, of right-circular cylindrical construction, thence counter-clockwise around the drum 12, and to and around an "exit" guide post 19, also of right-circular cylindrical construction, and thence away from the drum to and around a guide post 21. The posts 18, 19 are axially parallel to respective planes that are tangent to the drum at the drum generatrices where the tape arrives at and departs from the drum; and the posts 18, 19 are also tilted as shown in FIG. 2 to accommodate the helical path of the tape around the drum; also the guides 17, 21 are normal to the top plate 11, though the drum axis may be tilted with respect thereto, and the tape shanks between guides 17-18 and 19-21 have predetermined horizontal angular inclinations as they approach the drum (FIG. 1), all as taught in U.S. Pat. No. 4,040,575.

While the tape motion is counter-clockwise around the drum (FIG. 2) during forward mode, the reverse is true during rewind mode, and the tape moves in the direction of arrow 23 toward the entrance and exit guide mounting structures 26 and 27, respectively. (It is a convention that the "entrance" and "exit" guides take their names from their respective functions during forward modes and the guide names do not change when the tape is reversed during rewind).

To prevent the rewind mode whipping, doubling and jamming of the tape free end beneath the entrance guide 18 and guide structure 26, it has been found effective to mount a thin blade 31 to extend from the structure 26 and counter-clockwise around the drum and tape path for a considerable circumferential dimension, e.g. as much as 20 degrees of the drum circumference, the blade 31 being thickened or otherwise strengthened for rigidity near its mounting base 32, but tapering to a sharp edge at the free end 33, so that the flapping tape will not be prevented from redoubling as shown at 34, and instead will be permitted to do so (if it attempts to) while the blade tip 33 is inserted into the bend of the kink 34 so as to ensure that it will be smoothed out as the tape is pulled farther toward the guide 17.

A shallow groove 81 is formed in the tape-confronting surface of guide 31, to allow for passage of the head 13.

It should be cautioned that the precise configuration of the tape end 34 is not surely known to be as illustrated in FIG. 1, but is inferred from the following experimentally determined facts: (1) if the blade 31 is too short in its circumferential dimension, the tape still jams; and (2) the tape also jams if the blade 31 is too long. It would seem to be that a blade that is too short allows too much tape to redouble; and that a blade that is too long does not allow enough tape to redouble before the portion that is trying to redouble slips entirely beneath the blade, so that redoubling, when it eventually does take place, does so beneath the blade and thus avoids being smoothed out by the blade tip 33.

Whatever the explanation, it is empirically certain that a blade of just the right length works perfectly, while other lengths do not. Further explanation must await further theoretical investigations, which are not likely to be made, because the solution to the problem is now fully known.

The spacing of the blade radially from the drum is the same as that of the guides 18, 19, e.g., in the present apparatus, 10 mils; however, other spacings may also be effective.

As for the jamming of the tape end beneath the "exit" guide 19 and structure 27, it appears that this phenomenon is at least partly caused by the rapid flow of ambient air pumped by the drum 12 clockwise into the considerable space below and behind guide 19, as suggested by arrows 41, it being understood that the tape 16 has already departed from guide 18 when the tape end arrives at guide 18, and is then sucked across the gap 18–19.

One solution to this latter problem might be to fill up or baffle the large open zone immediately to the left of structure 27 (FIG. 2) and directly below guide 19, but since such a fill-in structure would often be encountered by the tape during threading and operation, to the damage of the tape if the fill-in structure is too rough, jagged or sharp, it would appear to be best to shape the fill-in structure to have a smooth and rounded surface like that of a tape guide. Therefore the simplest solution would appear to be an extension of the guide 19 such as the extension 51, shown particularly in FIG. 2, with perhaps a fairing or fill-in surface upstream and downstream therefrom. The extension 51 was tried experimentally without such a fairing, however, and surprisingly was fully effective. It therefore appears that complete filling-in is not needed; a structure like that of extension 51 that provides sufficient "blocking" of the tape against entering the air-flow space is enough.

It will of course be understood that the elements 19, 41 can be made as a single unitary structure rather than in two parts as illustrated, and of course will be so made for use in future new machines.

It should also be noted that an electrically conducting material is preferable in the guide 31 to avoid electrostatic clinging of the tape thereto.

What is claimed is:

1. Apparatus for smoothing out a kink in the free trailing end of a tape moving from an upstream tape path segment generally coincident with a rotating-head path of a magnetic tape scanning drum and toward a downstream tape path segment tangentially separating from the head path and approaching a first tape guide spaced from the drum, comprising:

means positioned alongside said tape path opposite said drum and upstream from the first guide, for encountering and smoothing out the approaching kink;

said smoothing out means being in the form of a thin blade presenting generally opposite major faces substantially concentric with said drum and defining therebetween an upstream blade edge portion and a downstream blade back portion; and said blade having a thickness dimension in a radial direction of said drum that is substantially smaller than the corresponding dimension of said kink, so as to cause said kink, upon first encountering said blade edge portion, to go into a whiplash mode and to flap around said blade edge portion and downstream therefrom against the major face of said blade that is remote from said drum and to be straightened and smoothed out by the cooperative action of its own downsteam acceleration and momentum, and thereafter to be pulled back in an upstream direction and around said blade edge portion, and thence downstream between said blade and drum, as by the continuing downstream movement of the mass of tape downstream from said free end segment thereof.

2. Apparatus as recited in claim 1; wherein said blade is mounted generally upstream from said tangential tape path segment.

3. Apparatus as recited in claim 1, wherein a second tape guide is also provided and is spaced substantially equally with said first guide from said drum;

said tape path being of helical form and of predetermined helical pitch dimension between said guides;

said second guide being formed to subtend the entire pitch dimension of the tape path around said drum and first guide.

4. Apparatus as recited in claim 1, wherein:

said blade has a thickened base and midportion downstream from said edge for greater strength and rigidity, and is relieved to define a re-entrant surface in the form of a groove confronting the head path to avoid wear of heads and tape in passage between said drum and blade.

5. Apparatus as recited in claim 4, wherein:

said guide has a predetermined radial spacing from said drum;

said re-entrant surface of said blade defining the groove thereof, has substantially the same radial spacing as said predetermined spacing, substantially throughout the circumferential dimension of the blade confronting the drum; and said blade adjacent said edge thereof has substantially the same width dimension as said tape.

6. Apparatus as recited in claim 5, wherein said blade is made of electrically conducting material to avoid the accumulation of static charges and the attraction of the tape thereto.

* * * * *